Jan. 31, 1961 G. W. WRIGHT ET AL 2,969,741
IMPELLER PUMP AND MOTOR-PUMP UNIT
Filed Sept. 19, 1957 2 Sheets-Sheet 1
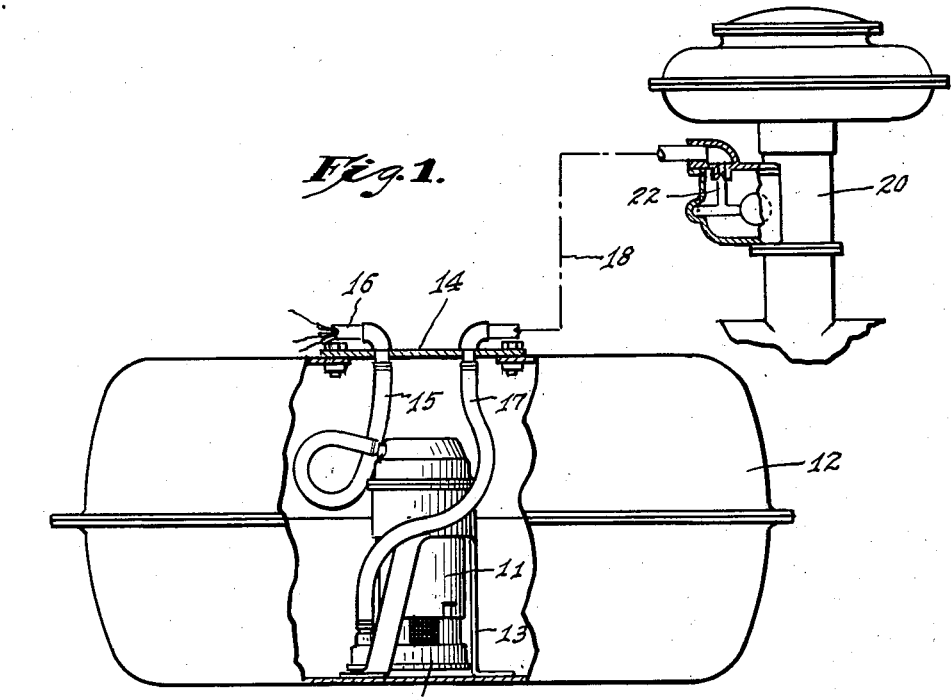
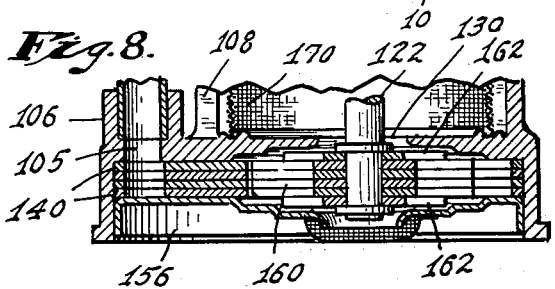
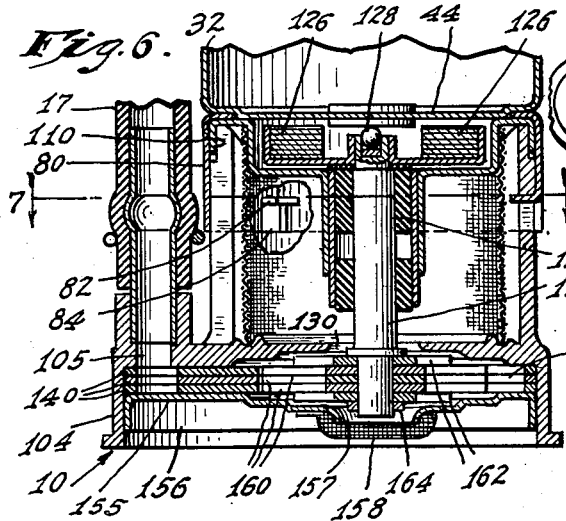
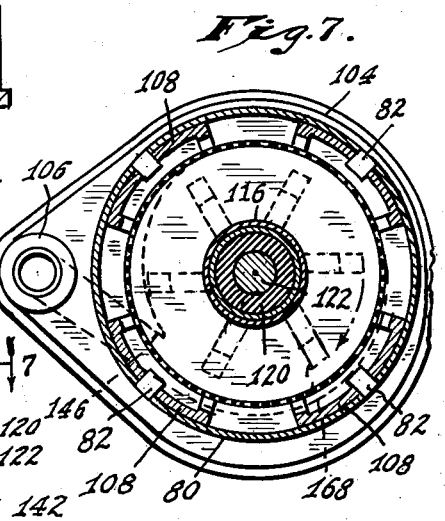
INVENTORS
GEORGE W. WRIGHT and
BY JOSEPH D. CLYMER,
ATTORNEYS.

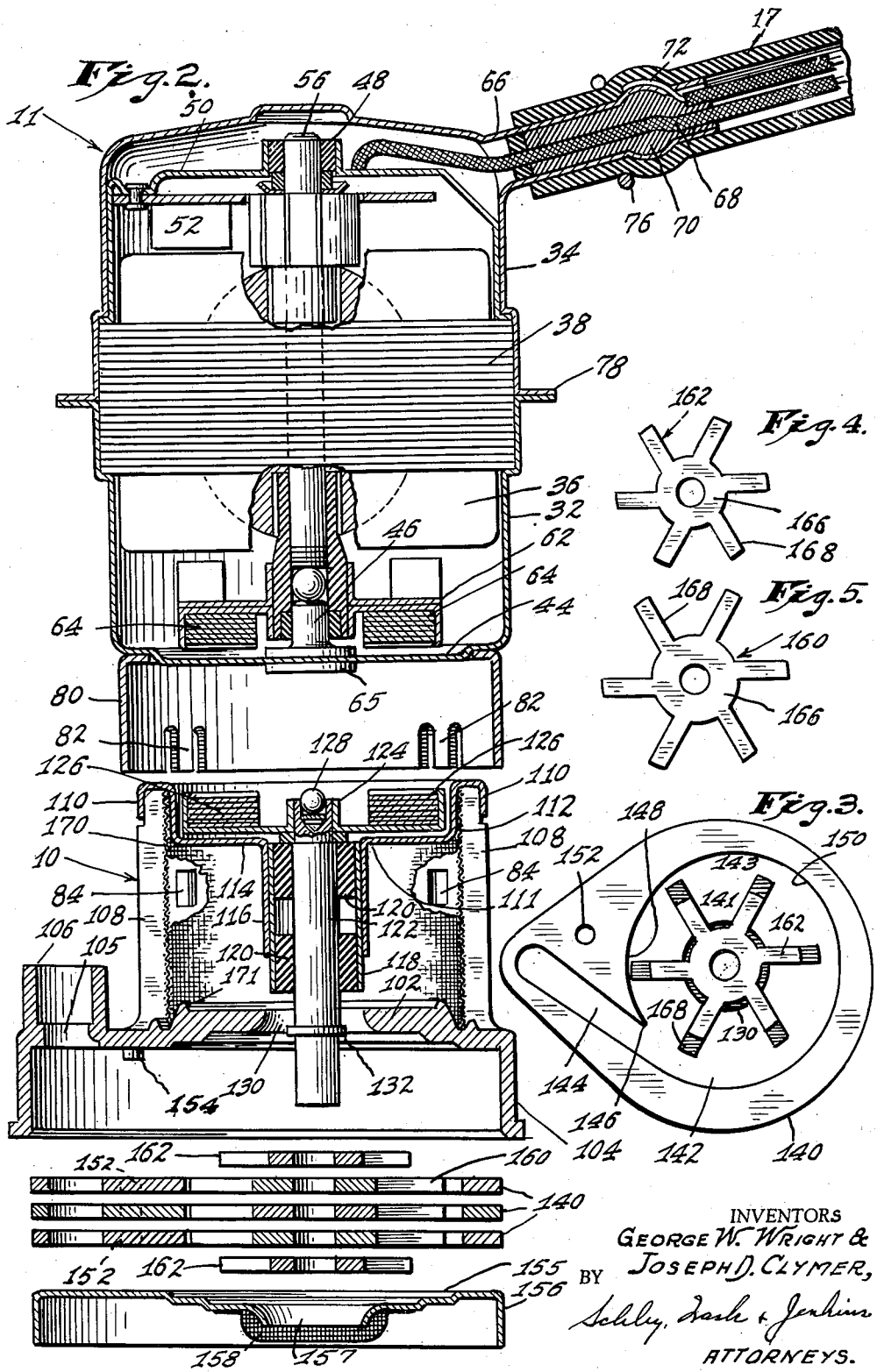

United States Patent Office 2,969,741
Patented Jan. 31, 1961

2,969,741
IMPELLER PUMP AND MOTOR-PUMP UNIT

George W. Wright, Yoder, and Joseph D. Clymer, Fort Wayne, Ind., assignors to Tokheim Corporation, Fort Wayne, Ind.

Filed Sept. 19, 1957, Ser. No. 685,013

7 Claims. (Cl. 103—87)

This invention relates to an impeller pump whose characteristics can be selectively varied during assembly, and to uniform-output motor-pump units for pumping fuel to the carburetor or other fuel mixing device of an internal combustion engine.

Certain features disclosed herein are described and claimed in co-pending applications: vapor-lock elimination in Serial No. 514,221; the magnetic drive features and system in Serial No. 538,753, now Patent No. 2,885,-126; and the submersible sealed motor unit in Serial No. 775,446.

It is a primary object of the invention to provide an impeller pump construction in which one or more pump characteristics, for example, its capacity and/or especially its output pressure, can be selectively varied during assembly, and which can be assembled selectively on a production basis to match or compensate for characteristics of its driving motor, for example, to compensate for the deviation from standard of the speed of a previously assembled and sealed motor unit.

It is a further object of the invention to provide an impeller pump construction in which the pump chamber and passages and the pump impeller may be selectively varied in axial thickness, by selection of parts during assembly, and preferably by selection of a greater or lesser number of duplicate parts or sets of parts, and in which the selective parts may be sheet-metal stampings.

It is a further object of the invention to provide improved motor-pump units for use as submerged automotive fuel pumps, and to provide a method of making the same with substantially uniform characteristics, particularly with uniform peak output pressures.

The invention of this application is of advantage in relation to the concept of co-pending application Serial No. 701,047, filed December 6, 1957, in which the driving motor unit of a submerged fuel pump device is built as a self-contained and sealed sub-assembly containing the driving member of a magnetic coupling, and such motor unit is combined with a separately assembled pump unit including a centrifugal pump, the driven member of a magnetic coupling, and bearings and housings therefor.

Electric-motor driven automobile fuel pumps must meet, and operate satisfactorily in spite of, a number of requirements and conditions. Supply voltage may substantially exceed its nominal rating (of 6 or 12 volts), and the high voltage condition may coincide with temperature or other conditions favorable to motor-pump operation, so that the motor-pump output tends substantially to exceed normal. Conversely, low voltage conditions may coincide with unfavorable cold temperatures to produce extremely adverse operating conditions. Demand will vary over a wide range, and the system must maintain, and handle, the pump output pressures at flow rates ranging from maximum down to and including zero flow. Peak output pressures must be limited to what the carburetor can control, or flooding will render the engine inoperative. Yet the whole level of output characteristics must be high to provide an operative fuel supply under adverse conditions.

Further, the direct-current motors manufactured for automotive use are not uniform in speed, and the range of speed variation or tolerance in commercial motors may be of the order of 15 percent or higher. Even such a degree of variation is highly undesirable in the output characteristics, and especially the pressure output, of fuel pumps driven by such motors; yet with submerged centrifugal fuel pumps, a variation in speed may produce an even greater variation in pressure output. For example, in tests of a fuel pump of the type shown in this application, an increase of not over 10 percent in pump speed—from about 4,000 r.p.m. to about 4,400 r.p.m.— produced an increase in pressure output of more than 20 percent; and in the same pump, a decrease of less than 15 percent in speed produced more than 30 percent decrease in pressure output. Such output variations are unacceptable in automotive fuel pump units. It is especially desirable in such units to control output pressures, particularly the maximum pressures which in centrifugal pumps occur at low-flow and zero-flow conditions, that is, at conditions where control by the carburetor is both highly important and difficult to maintain. Such maximum pressures should be held below a definite limit, with a high degree of uniformity from unit to unit.

The present invention provides for varying the pumps during assembly to compensate for the variation in motor speeds, and thus to obtain in combined motor-pump units a greater degree of uniformity, as of output pressure, than exists in the motors used to make such units.

In accordance with pump-construction aspects of the invention, the pump comprises a casing which forms one end wall or portion of the pump, and preferably forms an open-ended cavity with straight peripheral side walls, and the pump chamber is defined in such cavity by filler means of selected axial thickness and by casing means forming the opposite end wall of the pump. Provision is made for selecting filler means of different thicknesses, and thereby for providing pump chambers of different axial thicknesses. Either or preferably both ends of the pump are provided with inlet openings. The casing means forming one end wall of the pump is provided with a self-contained outlet opening, that is, with an outlet opening which is wholly formed by such casing means independently of the casing means which forms the other end wall of the pump. Such self-contained outlet is conveniently formed as an eccentric axially-extending opening through one end wall of the cavity.

The filler means is preferably a selected number of laminations, i.e. one or more, stacked against the casing end wall, and in the preferred construction, fitted within the straight side-walls of the open-ended cavity. The laminations are desirably sheet-metal stampings each of which has a punched pump-chamber opening—that is, an opening which has the cross-sectional shape of the pump chamber—and such opening is preferably one which includes an impeller sweep-space, a volute to which the impeller discharges, and more or less of a volute discharge passage. In a stack of such laminations, each defines one layer of the pump chamber, and the stack as a whole, with the end walls, defines the complete pump chamber. The outward extending discharge passage formed by the stack of laminations desirably extends to a point of communication with the self-contained outlet passage formed in the pump casing. By stacking a selected number of such layers or laminations, the pumping chamber and volute may be made of any desired axial thickness. In the preferred construction the chamber laminations are held in place by a cover member fitted within the straight side walls of the casing and secured in place.

Correspondingly, the pump rotor is selectively variable in thickness. It is desirably formed of a stack of laminations, preferably sheet-metal stampings, at least some of which are of the same thickness as the pump chamber laminations, so that chamber and impeller laminations can be used in sets to vary by equal amounts of axial thickness both the chamber and the impeller. The impeller laminations may interfit with each other to prevent relative rotation, and may be pressed on or otherwise fixed to the pump shaft.

In accordance with the method aspects of the invention, motor pump units are made using motors which vary in speed over a predetermined tolerance range. Each motor is tested to determine its inherent speed. A pump is assembled with it, in which the axial thickness of the impeller is varied, as by selecting a suitable number of impeller and pump chamber laminations, to suit its inherent speed. The variation in axial thickness of the pump varies the load which the pump imposes on the motor, and hence varies the speed of the motor-pump unit, which speed controls the pressure output of the pump. In this way, by increasing or decreasing the axial thickness of the pump in relation to the motor which is to drive it, motor-pump units are obtained whose pressure outputs are substantially uniform, and vary over a tolerance range substantially smaller than the range of variation in speed of the motors used.

The accompanying drawings illustrate the invention. In such drawings:

Fig. 1 is a diagrammatic view showing a motor-pump unit embodying the invention and mounted in an automotive fuel tank and connected to the engine carburetor;

Fig. 2 is an exploded view illustrating the structure and method of assembly of a pump embodying the invention, and the relation thereof to a sealed motor sub-assembly;

Fig. 3 is a plan view of a pump chamber lamination and an impeller, in operative relationship;

Fig. 4 is a plan view of an impeller lamination;

Fig. 5 is a plan view of an impeller end lamination;

Fig. 6 is an axial section of an assembled pump embodying the invention and connected to a sealed motor unit;

Fig. 7 is a horizontal section on the line 7—7 of Fig. 6; and

Fig. 8 is a fragmental section like Fig. 6, but showing an axially thicker pump.

The motor and pump unit shown in Fig. 1 comprises a pump 10 assembled to a sealed motor 11 to form a motor-pump unit. The unit 10—11 is mounted by a bracket 13 on the bottom of an automotive fuel tank 12 beneath an opening closed by a cover plate 14. An electrical supply line 16 for the motor-pump unit is connected through a fitting on the plate 14 and through a sealed flexible conduit 15 to the motor 11. A flexible delivery hose 17 connects the discharge of the pump 10 to an outlet fitting in the cover plate 14 and to a delivery line 18 leading to the fuel mixing device of the automotive engine, such as a carburetor 20 having a float controlled inlet valve 22.

As shown in Fig. 2, the motor unit 11 comprises a casing formed by two hat-shaped shells 32 and 34, which support and enclose stator windings 36 and core parts 38. The bottom of the shell 32 forms an imperforate diaphragm wall 44, and supports a bearing member 46 for the lower end of a rotor assembly. A cup-shaped frame member 50 supports an upper bearing 48 and a brush assembly 52 for the rotor. The rotor shaft 56 carries rotor windings and a commutator, and to its lower end is fixed a magnet carrier 62 containing an annular magnet 64 forming the driving member of a magnetic coupling operating through the imperforate diaphragm wall 44. The upper side wall of the top shell 34 carries a nipple 66 through which the electric supply line is brought into the motor. One wire 68 is sealed through the nipple by a mass of sealing compound 70. The opposite side of the electrical circuit is grounded to the motor shell 32—34, and a ground wire 72 is connected as by soldering to the nipple 66. The two wires 68 and 72 are sealed from the interior of the tank by the flexible conduit 17, which is clamped to the nipple 66 by a clamp 76.

The two shells 32 and 34 are secured and sealed to each other by their peripheral flanges 78, preferably by seam welding. The lower shell 32 carries a depending cylindrical skirt 80 concentric with the axis of the motor and the driving member of the magnetic coupling, to receive and align the pump sub-assembly described below.

The pump sub-assembly 10 shown in Fig. 2 comprises a single casting which forms the top or upper end wall 102 of the pump, a depending outer wall or skirt 104 for the pump body, an outlet boss 106 for the pump, and four angularly spaced posts 108 by which the pump body may be held in spaced assembled relation with the motor sub-assembly 11. The upper ends of the four posts 108 are received in a downwardly open annular channel section 110 of a sheet-metal housing 111 for the pump bearing and the driven magnet. The inner wall 112 of such channel section 110 merges at its lower edge with an inward radial wall 114 which is joined at its inner edge to a depending collar 116. A bearing sleeve 118 containing a pair of spaced bearings 120 is pressed in the collar 116. The channel 110 of the housing 111 fits snugly on the upper ends of the posts 108, and positons the bearings 120 on the axis of the pump.

A pump shaft 122 is journalled in the bearings 120 and has fixed to its upper end a carrier 124 containing an annular magnet 126 and forming the driven member of the magnetic coupling. The upper end of the shaft 122 carries a thrust-bearing ball 128 which in the assembled motor-pump unit bears against a thrust plate 65 carried by the end wall 44 of the motor shell 32, to take the magnet-traction thrust and position the pump rotor assembly in the pump body.

The lower end of the pump shaft 122 passes through an inlet eye 130 in the top wall 102 of the pump body, and is provided with a collar 132 substantially at the level of the bottom face of the pump body wall 102.

The pump body walls 102 and 104 form a downwardly-open cavity about the lower end of the pump shaft 122, with a cross sectional shape of the configuration shown by the outline of Fig. 3. The cavity is adapted to receive and align a stack of one or more sheet-metal pumping-chamber laminations 140 shown in plan in Fig. 3.

The laminations 140 have a central punched pump-chamber opening 142. Such opening may be of whatever shape is desired for the cross-section of the pump chamber. In the preferred form shown, the opening includes an impeller sweep-space 141 within the impeller circle defined by the ends of the impeller blades, a volute 143 of progressively increasing width about the sweep-space, and a tangential volute extension or discharge passage 144. The point of metal between the sweep-space 141 and the passage 144 forms the pump cut-off 146. For about 60° clockwise from this cut-off 146, (assuming a six-bladed impeller as shown,) the chamber 142 has a circular wall 148, to provide at all times a close clearance with at least one of the six legs of the impeller. The volute 143 begins at the end of this circular wall 148 and is defined by a spiral wall 150 which progressively diverges from the impeller circle and merges at its outer end with the outer side wall of the passage 144. The passage 144 leads to a point which will lie immediately below the outlet passage 105 through the outlet boss 106 of the pump body casting. The chamber laminations 140 may also be provided with a guide hole 152 to fit over a guide pin 154 formed on the pump casting. The complete pumping chamber, including an impeller sweep-space, a volute, and a discharge passage, is formed by a stack of the laminations 140 fitted within the wall 104 and against the top wall 102 of the pump body casting. The bottom wall 155 of the pumping chamber is provided by a sheet-metal cover 156 inserted within the peripheral wall 104 against the stack of laminations and secured in place, as by staking. The bottom wall contains a bottom inlet eye 157, protected by a hat-shaped screen 158 secured at its edges against the bottom face of the stamping 156.

The pump impeller shown in the drawings is also formed of a stack of laminations. These include a number of main laminations 160 of the same thickness as the volute laminations, and a smaller end lamination 162 at each end of the impeller. The main impeller laminations 160 are desirably of the same axial thickness as the pump chamber laminations, and conveniently are stamped from the slugs of metal removed in forming the main openings of the pump-chamber laminations. A stack of laminations 160 and 162 is pressed on the lower end of the shaft 122 against the collar 132, and held in place by an outer collar 164.

The impeller laminations are shaped in plan as shown in Figs. 4 and 5, with a central hub 166 and six arms 168, the forward faces of which are true radial faces with respect to the axis of the hub 166. The end laminations 162 are of the same shape as the main laminations 160, except that their hubs are smaller and their arms shorter.

The assembled impeller has a solid central hub of approximately the same diameter as the top and bottom eyes 130 and 157 of the pump, and projecting impeller blades which are openly spaced from each other in the pumping chamber. The impeller thus provides a non-vapor-locking pump in accordance with the teachings of co-pending application Serial No. 514,221. The top eye 130 of the pump is open to the surrounding body of liquid by way of the spaces between the posts 108, and is protected by a cylindrical screen 170 positioned at the bottom by a rim 171 on the pump body wall 102, and positioned at the top by the inner wall 112 of the housing 111.

The pump end walls 102 and 155 may define end portions of the pumping chamber, and as shown, the end walls have cavities which form the sweep-spaces for the end laminations 162 of the impeller. The end walls may form greater end portions of the pumping chamber, including portions of the volute and discharge passage, but at least a major portion of the axial thickness of both the pump chamber and impeller is formed by a stack of one or more laminations. The number of laminations in the stack can then be varied to produce major variations in the axial thickness of the pump, either to vary its volumetric capacity or other characteristics, to match or compensate for different operating conditions. Variation of axial thickness is especially advantageous to compensate for non-uniformity in production motors by which the pumps are driven.

In the exploded view of Fig. 2, pump has three pumping chamber laminations 140 and three main impeller laminations 160, arranged in sets, and the impeller also has two end laminations 162. The pump assembled with three sets of laminations is shown in Fig. 6. In this figure, it will be noted that the pump cover 156 is positioned inward from the lower end of the pump casing side wall 104, so that tolerance is provided to permit the use of four or five sets of laminations. As Fig. 8 shows, a pump with four sets of laminations has substantially greater axial thickness, both in the pumping chamber and in the impeller. As a result, the four-layer pump of Fig. 8 has a greater volumetric capacity, but since its impeller is of the same diameter as the three-layer pump of Fig. 6, it will produce the same output pressure if run at the same speed. But with its greater axial thickness, the four-layer pump will impose a greater load on an automotive type motor and will slow it down, and at the slower speed the same-diameter impeller will produce a lower output pressure.

In the motor pump unit shown in the drawings, the motor unit 11, including the driving magnet 64 of the magnetic coupling, is completely assembled and sealed as a unit, independently of the pump unit 10. Likewise, the pump unit 10 may also be completely assembled as an independent unit, including the pump housing, the pump shaft and its bearings, the impeller, and the driven member of the magnetic coupling. The two sub-assembled units 10 and 11 are brought together to form a motor-pump unit. For this, the upper end of the pump unit 10 is inserted within the aligning skirt or sleeve 80 of the motor unit 11, and is secured therein by tongues 82 formed in the walls of the sleeve 80 and bent inward into openings 84 formed in the posts 108 of the pump casting.

Whether or not the motor and pump are assembled as independent units, the pump construction of this invention, using a variable number of sets of pump chamber laminations 140 and impeller laminations 160, permits the pump characteristics to be selectively varied in accordance with the number of sets of laminations used. Further, by this same selective variation, the characteristics of the assembled motor-pump units can also be controlled and varied.

For example, by using a larger number of sets of laminations, the axial thickness of the pumping chamber and impeller is increased and the load which the pump imposes on the motor is increased, with the result (with automotive type electric motors) that the additional load reduces the motor speed; and since the impeller diameter is unchanged the reduced speed at which the motor then drives the pump reduces the output pressure of the motor-pump combination. Conversely, by decreasing the axial thickness of the pump, the output pressure of the combination is raised. This variation occurs to a certain extent over the whole range of delivery rates, but it is most pronounced at low delivery rates, and exhibits its greatest effect at "shut-off" conditions when delivery flow is blocked, as by the carburetor intake valve 22. Since it is characteristic of centrifugal pumps that especially high peak pressures occur at shut-off conditions, the control afforded by varying the number of laminations is especially valuable.

This effect of reducing speed and output pressure by increasing the number of sets of laminations in the pump is illustrated by the results obtained by varying the number of sets of laminations in a pump driven by the same motor with the same power supply. The results obtained with different numbers of sets of laminations were as follows:

| Number of Laminations (146 and 160) | R.P.M. | Maximum Pressure Produced, Pounds per square inch |
|---|---|---|
| 1 | 4950 | 7½ |
| 2 | 4550 | 7⅛ |
| 3 | 4250 | 6¾ |
| 4 | 4070 | 6⅜ |

It will be seen from the foregoing table that if a high-speed motor produces an excessive pressure, the speed and pressure can be reduced by increasing the number of sets of laminations in the pump driven by the motor. Correspondingly, if a slow-speed motor produces too low a pressure, the speed and pressure can be increased by decreasing the number of sets of laminations in the pump. While these changes also change the volumetric capacities of the pumps, the pump design can provide excess capacity without untoward side effects so that the capacity changes produced will cause no harm.

By reason of these characteristics, it becomes possible in accordance with our invention to produce motor-pump units on a production basis in which the output pressure from unit to unit varies over a range substantially smaller than the range of variation in speed of the motors used, and with substantially uniform peak pressures. This is done as follows:

It may be assumed that the motors used are made to operate at speeds within a specified tolerance range, say within a range of plus or minus 500 r.p.m. from a nominal speed of 4500 r.p.m. The motors are individually tested to determine their inherent specific speeds, as with a standard test load, for example, by assembling the motor with a test pump and observing whether it produces an excessive or too low a pressure, as explained in connection with the above table. Pumps are then assembled with the motors, in which the axial thickness of the pumping chamber and impeller is selected to compensate for the specific speed of the motor. If the specific motor speed is low, that is, if the test pump driven by the motor gives insufficient pressure output, the pump assembled therewith is assembled with a reduced number of sets of laminations, to increase the speed and output pressure of the resulting motor-pump unit. Conversely, if the motor speed and test-pump pressure is high, the pump assembled with it is provided with a larger number of sets of laminations, to increase the load imposed on the motor, slow it down, and decrease both the speed and the output pressure of the combined motor-pump unit.

We claim as our invention:

1. A motor-pump unit in which the motor is of a type in which speed varies with load and in which speed varies from motor to motor over a tolerance range, a centrifugal pump assembled to said motor, said pump comprising a casing forming an open-ended cavity having an end wall and a circumferentially-continuous side wall, a pump chamber defined at least in part by a number of chamber laminations received and fitted within said cavity and containing chamber-forming apertures, each said lamination providing a layer of axial thickness for the chamber, a pump impeller in said chamber and formed at least in part of a number of laminations of equal thickness with said chamber laminations, an outlet for said chamber opening through said cavity end wall and communicating with the chamber defined by said lamination apertures, second casing means forming a second end wall for said cavity secured in sealing relation within said side wall and against said chamber laminations to retain said laminations in place in the cavity and to close the cavity about the same, the number of chamber and impeller laminations being selected in relation to the speed characteristics of the motor with which the pump is assembled to vary the loading which said pump imposes on the motor and thereby vary inversely the speed of the combined motor and pump unit and limit the output pressure thereof to one within a tolerance range narrower than that of the motors.

2. An impeller pump for submerged operation in a body of liquid such as in an automotive liquid fuel tank, comprising pump-casing means forming an open-ended cavity defined at one end by an end wall and bounded by a peripherally-complete side wall, second pump casing means forming a second end wall for said cavity, at least one of said end walls being formed with a central inlet opening and one of said casing means having a self-contained outlet opening spaced radially from said inlet opening, a plurality of pump chamber laminations stacked in said cavity against said first end wall and fitted within and positioned by said side wall, each said lamination having a central aperture therein forming a layer of a pump chamber about and open to said central inlet and each such lamination aperture having a lateral portion extending to said radially-spaced outlet opening for connecting said pump chamber to said outlet, said second end wall being received in sealing relation within said side wall and against said stack of laminations and being secured to said side wall to retain said laminations in place and to close the cavity about the same, and a centrifugal impeller mounted for rotation in said pump chamber for pumping liquid from said inlet to said outlet.

3. A centrifugal pump as defined in claim 2 in which the outlet opening is an eccentric axial opening through one of said cavity end walls and each lamination aperture comprises a central portion forming an impeller sweep space surrounded by a volute portion connecting to a discharge passage portion leading from the volute to a discharge area substantially registering with said eccentric outlet opening.

4. An impeller pump as defined in claim 2 in which said second end wall is receivable in said cavity in a plurality of axial positions to retain and enclose a selected number of pump chamber laminations in said cavity and thereby provide a pump of selected axial thickness.

5. An impeller pump as defined in claim 4 in which said impeller comprises a stack of impeller laminations at least one of which is of equal thickness with a chamber lamination, whereby the axial length of the chamber and impeller can be selectively varied by selectively varying the number of sets of equal-thickness impeller and chamber laminations used.

6. An impeller pump for submerged operation in a body of liquid such as in an automotive liquid fuel tank, comprising pump-casing means forming an open-ended cavity defined at one end by an end wall and bounded by a peripherally-complete side wall, second pump casing means forming a second end wall for said cavity, at least one of said end walls being formed with a central inlet opening and one of said casing means having a self-contained outlet opening spaced radially from said inlet opening, at least one filler lamination positioned in said cavity against said first end wall and fitted within and positioned by said side wall, each such lamination having an aperture therein, such aperture having a central pump chamber-forming portion about and open to said central inlet and having a lateral portion extending to said radially-spaced outlet opening for connecting the pump chamber to said outlet, said second end wall being secured in sealing relation within said side wall and against said filler lamination to retain the filler lamination in place and to close the cavity about the same, and a centrifugal impeller mounted for rotation in said pump chamber for pumping liquid from said inlet to said outlet.

7. An impeller pump, comprising a casing forming an open-ended cavity having an end wall and a peripherally-complete side-wall, a pump outlet passage extending through said end wall from an eccentric point of said cavity, a rotatably supported pump shaft extending axially in said cavity, a stack of apertured chamber laminations fitted in said cavity and having apertures which together define therein a pump chamber about said shaft and a discharge from said chamber communicating with said outlet passage, a stack of impeller laminations mounted on said shaft to form an impeller in said chamber and including at least some laminations of the same thickness as chamber laminations, said cavity and shaft being of sufficient axial length to receive a variable number of sets of equal-thickness chamber and impeller laminations to vary selectively the axial thickness of said chamber and impeller, and a cover received in sealing relation within said side wall and against said stack of chamber laminations and being secured to said side wall to retain said laminations in place in the cavity and to close the cavity about the same, and central pump inlets in said cavity end wall and cover.

References Cited in the file of this patent

UNITED STATES PATENTS

| | | |
|---|---|---|
| 765,969 | Hanson | July 26, 1904 |
| 2,372,423 | Hornschuch | Mar. 27, 1945 |
| 2,613,058 | Atkinson | Oct. 7, 1952 |
| 2,662,206 | Schaefer | Dec. 8, 1953 |
| 2,670,686 | Bergh | Mar. 2, 1954 |
| 2,752,461 | Euler | June 26, 1956 |
| 2,784,673 | Namur | Mar. 12, 1957 |
| 2,816,509 | Rice | Dec. 17, 1957 |

FOREIGN PATENTS

| | | |
|---|---|---|
| 110,760 | Australia | June 4, 1940 |
| 141,017 | Great Britain | Dec. 17, 1919 |